US006868410B2

(12) United States Patent
Fortin et al.

(10) Patent No.: US 6,868,410 B2
(45) Date of Patent: Mar. 15, 2005

(54) HIGH-PERFORMANCE LOCATION MANAGEMENT PLATFORM

(76) Inventors: Stephen E. Fortin, 10 Bear Club Crossing, Saratoga Springs, NY (US) 12866; Scott Petronis, 34 Hadel Rd., Glenville, NY (US) 12302; Arthur R. Berrill, 10 Goodwood Street, P.O. Box 27, Goodwood, Ontario (CA), L0C 1A0; Justinian Barota, 45 Carlton Street #1706, Toronto, Ontario (CA), M5B 2H9; Brian R. Allen, 50 Robinson Street, Markham, Ontario (CA), L3P 1N6; George Moon, 53 Briardale Place, Aurora, Ontario (CA), L4G 6M4

( * ) Notice: Subject to any disclaimer, the term of this patent is extended or adjusted under 35 U.S.C. 154(b) by 590 days.

(21) Appl. No.: 09/874,271

(22) Filed: Jun. 5, 2001

(65) Prior Publication Data

US 2002/0188581 A1 Dec. 12, 2002

(Under 37 CFR 1.47)

Related U.S. Application Data

(60) Provisional application No. 60/109,460, filed on Jun. 5, 2000, and provisional application No. 60/270,919, filed on Feb. 22, 2001.

(51) Int. Cl.[7] ................................................. G06N 5/00
(52) U.S. Cl. ..................... 706/45; 707/100; 707/103 R; 345/423
(58) Field of Search ........................... 706/45; 707/100, 707/103; 345/423; 370/352; 379/211.02

(56) References Cited

U.S. PATENT DOCUMENTS 5,142,654 A    8/1992  Sonberg et al.

(List continued on next page.)

OTHER PUBLICATIONS

Guttman A., "R–Trees: A Dynamic Index Structure for Spatial Searching", *Proc. ACM Sigmond*, pp. 47–57 (1984).

*Primary Examiner*—Wilbert L. Starks, Jr.
(74) *Attorney, Agent, or Firm*—Dickstein Shapiro Morin & Oshinsky LLP

(57) ABSTRACT

An apparatus and method for rapid translation of geographic latitude and longitude into any of a number of application-specific location designations or location classifications, including street address, nearest intersection, PSAP (Public Safety Answering Point) zone, telephone rate zone, franchise zone, or other geographic, administrative, governmental or commercial division of territory. The speed of translation meets call-setup requirements for call-processing applications such as PSAP determination, and meets caller response expectations for caller queries such as the location of the nearest commercial establishment of a given type. To complete its translation process in a timely manner, a memory-stored spatial database is used to eliminate mass-storage accesses during operation, a spatial indexing scheme such as an R-tree over the spatial database is used to locate a caller within a specific rectangular area, and an optimized set of point-in-polygon algorithms is used to narrow the caller's location to a specific zone identified in the database. Additional validation processing is supplied to verify intersections or street addresses returned for a given latitude and longitude. Automatic conversion of latitude-longitude into coordinates in different map projection systems is provided.

The memory-stored database is built in a compact and optimized form from a relational spatial database as required. The R-tree spatial indexing of the memory-stored database allows for substantially unlimited scalability of database size without degradation of response time. Maximum performance for database retrievals is assured by isolating the retrieval process from all updating and maintenance processes. Hot update of the in-memory database is provided without degradation of response time.

84 Claims, 9 Drawing Sheets

U.S. PATENT DOCUMENTS

| | | |
|---|---|---|
| 5,295,180 A | 3/1994 | Vendetti et al. |
| 5,758,288 A | 5/1998 | Dunn et al. |
| 5,796,634 A | 8/1998 | Craport et al. |
| 5,805,153 A | 9/1998 | Nielsen |
| 5,815,810 A | 9/1998 | Gallant et al. |
| 5,842,122 A | 11/1998 | Schellinger et al. |
| 5,848,373 A | 12/1998 | DeLorme |
| 5,907,608 A * | 5/1999 | Shaffer et al. ......... 379/211.02 |
| 5,922,040 A | 7/1999 | Prabhakaran |
| 5,933,144 A | 8/1999 | Alcorn |
| 5,938,721 A | 8/1999 | Dussell et al. |
| 5,950,125 A | 9/1999 | Buhrmann et al. |
| 5,961,572 A | 10/1999 | Craport et al. |
| 5,966,658 A | 10/1999 | Kennedy, III et al. |
| 5,973,643 A | 10/1999 | Hawkes et al. |
| 5,978,747 A | 11/1999 | Craport et al. |
| 5,982,868 A | 11/1999 | Shaffer et al. |
| 5,987,454 A | 11/1999 | Hobbs |
| 5,991,739 A | 11/1999 | Cupps et al. |
| 6,026,345 A | 2/2000 | Shah et al. |
| 6,055,522 A | 4/2000 | Krishna et al. |
| 6,069,627 A | 5/2000 | Conrad et al. |
| 6,081,518 A * | 6/2000 | Bowman-Amuah ......... 370/352 |
| 6,101,496 A | 8/2000 | Esposito |
| 6,212,392 B1 | 4/2001 | Flitch et al. |
| 6,247,019 B1 * | 6/2001 | Davies ................... 707/103 R |
| 6,262,741 B1 * | 7/2001 | Davies ....................... 345/423 |

\* cited by examiner

HIGH-PERFORMANCE LOCATION MANAGEMENT PLATFORM

CROSS-REFERENCE TO RELATED APPLICATIONS

This application claims the benefit of U.S. Provisional Patent Application Ser. No. 60/209,460, filed Jun. 5, 2000, U.S. Provisional Patent Application Ser. No. 60/270,919, filed Feb. 22, 2001, and U.S. Provisional Patent Application Ser. No. 60/231,900, filed Sep. 11, 2000.

FIELD OF INVENTION

This invention relates generally to real-time systems for location determination, and more specifically to real-time telephony systems for location and zone determination.

DEFINITIONS

Geocoding, also called "forward geocoding", is the assignment of a geographic latitude and longitude or other geographic coordinates to an identified location, zone, or address.

"Reverse geocoding" is the determination of an identifier for a location, zone, or address using a geographic latitude and longitude or other geographic coordinates.

"Point-in-polygon processing" refers to the execution of software to determine whether or not a given point lies within the boundary, on the boundary, or outside of a given closed polygon.

"Polygon-in-polygon processing" refers to the execution of software to determine whether or not a given closed polygon: 1) lies within the boundary of a second given closed polygon, 2) lies outside of the second given closed polygon, 3) overlaps the second given closed polygon. Subcases exist when the two polygons are in contact at points or along edges.

CBB—Campus-Based Billing
GLSB—Geographic Location Services Broker
HLR—Home Location Register
LBB—Location-Based Billing
LMP—Location Management Platform
MBR—Minimum Bounding Rectangle
MER—Minimum Enclosing Rectangle (synonym for MBR)
MPC—Mobile Positioning Center
MSC—Mobile Switching Center
PDE—Position Detection Equipment
PSAP—Public Safety Answering Point
SCP—Service Control Point
VLR—Visitor Location Register

DISCUSSION OF PRIOR ART

The operation of wireless communication systems entails the translation of latitude and longitude information ("lat-long") into specific physical, geographic, and administrative terms. In a first example, telephone calls must be billed according to the caller's location or zone. Such a location or zone must be quickly and accurately determined from a lat-long during call setup or closure. In a second example, wireless callers may need to know what landmark is near them, for purposes of navigation. In these and other applications, the process of mapping a given lat-long to some division of territory or some known landmark must be done quickly, accurately, and at relatively low cost.

While the problem appears straightforward, a simple database system for determining a landmark or zone from a latitude and longitude can turn out to be very large and slow in response. The granularity of the map is a major factor in sizing such a database. The U.S. federally-mandated E911 initiative will require location resolution to approximately 100 meters. If the provider of services wishes to determine a location on a continent to within 100 meters, a map of a 5000 by 5000 kilometer area would require the classification of 2.5 billion separate areas.

A second major factor in the database sizing is the irregularity of shape of the zones being used. Normally a zone is defined as a polygon, which requires the identification of all the vertices of the polygon. If a zone requires 100 vertices for its definition, each vertex must be stored in the database in some form as part of the zone. In the continental example, zones of about 10 by 10 kilometers would require listing about 25 million vertices.

Another critical problem is the determination of whether or not a given point lies within a given polygon on a map. This problem is soluble but computationally difficult, requiring significant time for a computed solution. The time required can exceed the time available during a call.

Underlying all of these problems are the general problems of availability, stability, and reliability of the system solving them. Any solution to the problems of database size and performance must meet stringent telephony system requirements in these areas.

Forward geocoding is the translation of a named address, location or zone into a latitude and longitude. Reverse geocoding is the opposite process. U.S. Pat. No. 5,991,739 (Cupps et al.) teaches the use of forward geocoding to determine an appropriate franchise zone in an Internet commerce application. U.S. Pat. No. 5 5,978,747 (Craport et al.), which also uses forward geocoding, uses polygon-in-polygon processing and a plurality measure to decide whether or not one region is inside another. U.S. Pat. No. 5,961,572 (Craport et al.), which also uses forward geocoding, uses point-in-polygon processing and a plurality measure to decide whether or not a point is inside a region. U.S. Pat. No. 5,796,634 (Craport et al.), which also uses forward geocoding, uses point-in-polygon processing and a plurality measure to decide whether or not a region associated with a point is inside another region. None of the Cupps and Craport patents address any requirement for response times consistent with telephone call processing. All of these patents teach the use of forward geocoding, that is, the translation of a given address or named location to a latitude and longitude or other coordinate system. None of them teach the use of reverse geocoding, which translates from latitude and longitude into a named address, location or zone. None of them provides any means of determining rapidly how a location's latitude and longitude translate to the everyday referents, such as geographic zones, landmarks, street addresses, road names or buildings, which people and automated processes use to convey different kinds of meaning.

To summarize, the problems faced in determining location or zone from a latitude and longitude require fast, accurate, inexpensive and reliable methods and equipment. Such solutions are not currently available.

SUMMARY

The invention accomplishes the rapid translation of geographic latitude and longitude into any of a number of application-specific location designations or location classifications. These designations and classifications include street address, nearest intersection, PSAP (Public Safety Answering Point) zone, telephone rate zone, franchise zone, or other geographic, administrative, governmental or commercial division of territory. The speed of translation meets call-setup requirements for call-processing applications such as PSAP determination, and meets caller response expectations for caller queries such as the location of the nearest commercial establishment of a given type. To complete its translation process in a timely manner, the invention uses a memory-stored spatial database to eliminate mass-storage accesses during operations, a spatial indexing scheme such as an R-tree over the spatial database to locate a caller within a specific rectangular area, and an optimized set of point-in-polygon algorithms to narrow the caller's location to a specific zone identified in the database. Additional validation processing is supplied to verify intersections or street addresses returned for a given latitude and longitude. Automatic conversion of latitude-longitude into coordinates in different map projection systems is provided.

The invention's memory-stored database is built in a compact and optimized form from a persistent spatial database as required. The compact R-tree spatial indexing of the memory-stored database allows for substantially unlimited scalability of database size without degradation of response time. The invention insures maximum performance of its database retrievals by isolating the retrieval process from all updating and maintenance processes. Hot update of the in-memory database can be provided without degradation of response time.

DETAILED DESCRIPTION OF INVENTION

Applications

Figure 1:
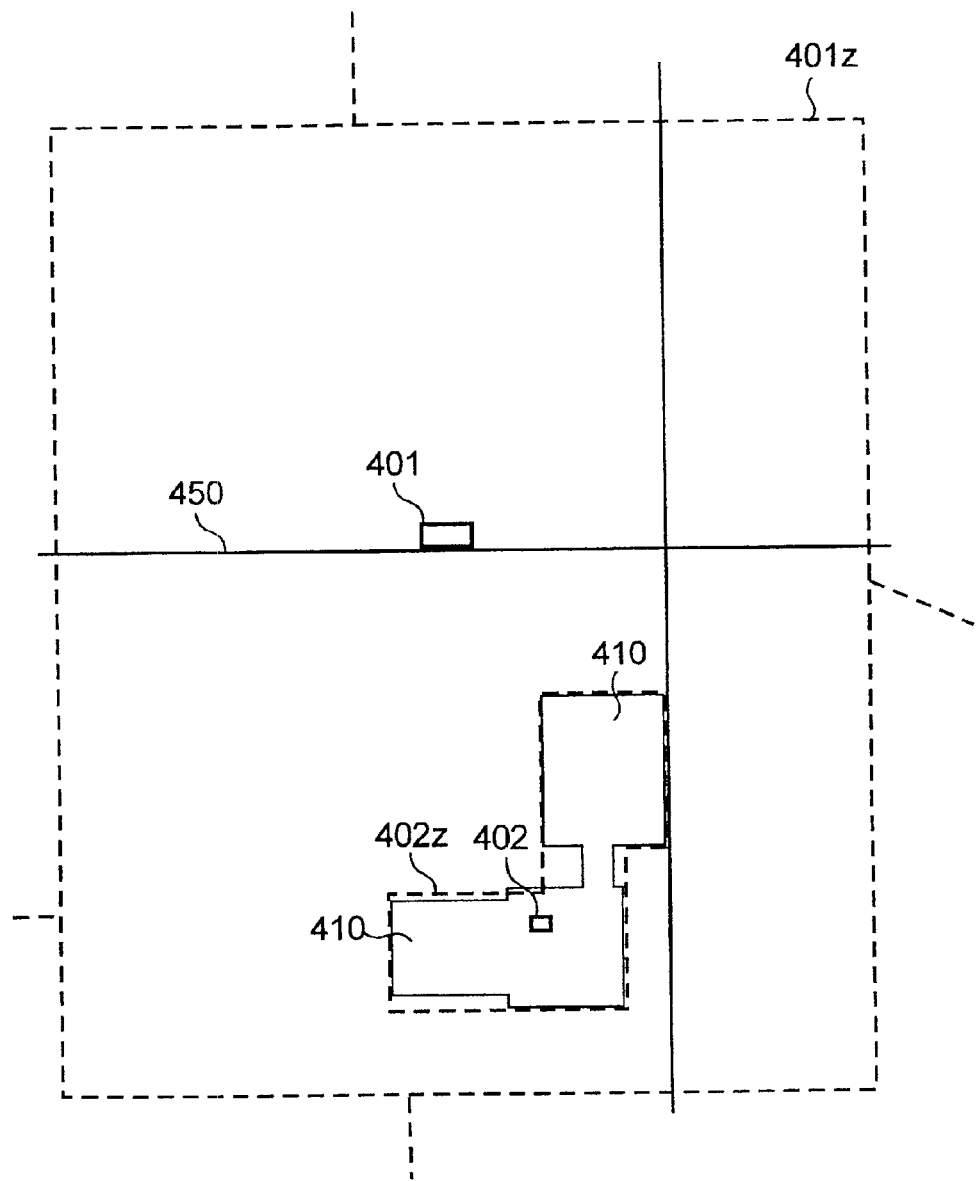
FIG. 1 shows the determination of a franchise zone for a mobile telephone call.

The invention's applications are a suite of computer programs that operate as a Location Management Platform program, or LMP, in a wireless telephony system. The invention provides multiple services, including E911 service, location-based call billing, 411 franchise zone location, and GLSB, or the Geographic Location Services Broker, for determining accurate street addresses.

The E911 Application

The first application is E911, for emergency services. E911 service is mandated by the FCC to determine the caller's location and send out emergency services to that location. In Phase 1 of the mandate, the location must be specified in terms of the cell of origin, or in effect the area around the cell tower where the call originated. In Phase 2, the location must be specified within 250 feet.

When a caller makes an E911 call, one approach is to have the network communicate with the cellphone through three or more cell towers. Position determining equipment, or PDE, uses the inputs from the towers to triangulate to determine the originating position of the call. Some cellphones carry a global positioning system (GPS) unit inside the phone. Such phones use three or more satellites to triangulate the call's originating position. Often a combination of tower and GPS sources will be used to satisfy the E911 mandates. The PDE resolves its inputs into a location expressed as a latitude and longitude, or lat-long, for the call's originating point.

In a matter of milliseconds, the call is routed through several different components within the network. An HLR, or home location register, determines the caller's home telephone number. A VLR, or variable location register, processes roaming callers by assigning a temporary telephone number to the calling phone. An SCP, or service control point, manages call routing and billing. An MPC, or mobile positioning center, determines the originating position of the call.

The SCP communicates with the MPC to retrieve the position information and forward it to the E911 dispatcher. The invention is a module integrated with the MPC information, and is called a Location Management Platform, or LMP. During the interval of milliseconds allotted to call processing during call setup, the invention determines what public safety answering point, or PSAP, should be notified on the caller's behalf. The invention's ability to determine the correct PSAP within a few milliseconds makes the invention commercially and statutorily acceptable in support of the E911 application.

The LBB and CBB Applications

A second application is location-based billing, or LBB, for mobile telephone service. Using the same PDE inputs as for the E911 application, the invention determines the rate zone for the calling point. This allows cellular service providers to organize customized billing zones for its customers, such as a circle of ten-kilometer radius around a customer's home and another such circle around the same customer's place of work. Calls from within either area would be billable at a lower rate than calls from outside both areas.

The same method is usable for irregularly-shaped areas such as college campuses. In this context the application is called campus-based billing (CBB). Students on campus using the invention's capabilities can make calls on that campus with reduced rates. The sole difference between LBB/CBB and E911 is the use of telephone rate zones instead of PSAP areas. The response time requirement of less than one second still applies, since the rate determination is made as a part of call setup. In either case, the ability to offer location-and campus-based billing enhances the attractiveness and capabilities of a wireless or cellular phone service provider's offerings.

The 411 Application

A third application is the selection of franchise zones to assist a mobile caller. This application extends the 411 Directory Assistance application to select a specific commercial establishment for a caller without requiring the caller to contact Directory Assistance and receive inadequate information or no information at all. In this application, a commercial firm with franchise locations defines the zone of call dispatching for each franchise in an area. A call to a common number for that firm is then routed to a franchise based on the originating point of the call.

See FIG. 1 for an example. A coffee-shop chain such as Starbuck's might have a large shop franchise 401 on a major city street 450, and a smaller shop franchise 402 within a shopping mall 410 not far away. In this situation, the chain wishes to direct callers outside the mall to shop 401, and callers inside the mall to shop 402. The chain establishes a franchise zone 401z for shop 401, and a franchise zone 402z, nested inside zone 401z, for shop 402. A caller specifies a general number for Starbuck's. If the caller is inside zone 401z but outside zone 402z, the invention routes the call to shop 401. If the caller is inside zone 402z, the invention routes the call to shop 402. As before, the response time requirement of less than one second still applies, since the franchise selection is made as a part of call setup.

To summarize these three applications: the invention assumes a mobile call that includes positioning data such as latitude and longitude to give point or polygon coordinates for the call's point of origin. For the E911 and 411 applications, the invention enables connection of such a call to a service provider selected geographically for calls made from that point or polygon. The caller enters a general number, not the number of any one area, and then the invention and the call-handling equipment connect the caller to the number of the appropriate geographical service provider. For the LBB or CBB call, the caller's location serves to identify a rate class within which the call is to be billed. Using the invention's capabilities for call setup, many more such applications are possible.

The GLSB Application

The invention's fourth application, Geographic Location Services Brokering, or GLSB, provides a World Wide Web-related caller service instead of a call setup service. Many commercial establishments using the World Wide Web for commerce have no ready access to latitude and longitude data, and no convenient way to use it. Instead, they rely on a caller's use of address information to determine a ZIP code, a city block, or other location information useful to the Website. For a mobile caller, however, such address information is not available on a reliable basis.

When the mobile caller is equipped with a Web-enabled wireless phone, having the address nearest the phone itself is especially advantageous. The Web-enabled wireless phone can be used to access Websites, displaying information formatted to fit the phone's handheld display. A caller can access a hotel, restaurant, auto rental or other commercial Website, enter the phone's location on a Web page form displayed by the site, and transmit the caller's current address to the Website as data. The Website then looks up the provided address to determine which zone it falls in, and returns the location of the appropriate facility nearest to the caller, along with information concerning that facility. The invention provides this capability through the GLSB, in effect, enabling the wireless Web to operate with location information.

A simple example of the GLSB application is its use to determine a nearest address, access a hotel-chain Website, enter the nearest address on the hotel chain's form displayed by the Web browser, and get back the address of the nearest hotel from that chain, together with directions. The invention's contribution to this process is the furnishing of the street address nearest to the point of origin of the call.

The invention determines the nearest street address using the following process. First, the PDE passes the latitude and longitude to the invention. The invention uses the latitude and longitude to look up a set of zones in a spatial database containing address information. Each zone found contains a range of streets and street intersection coordinates for an area.

Figure 2A:
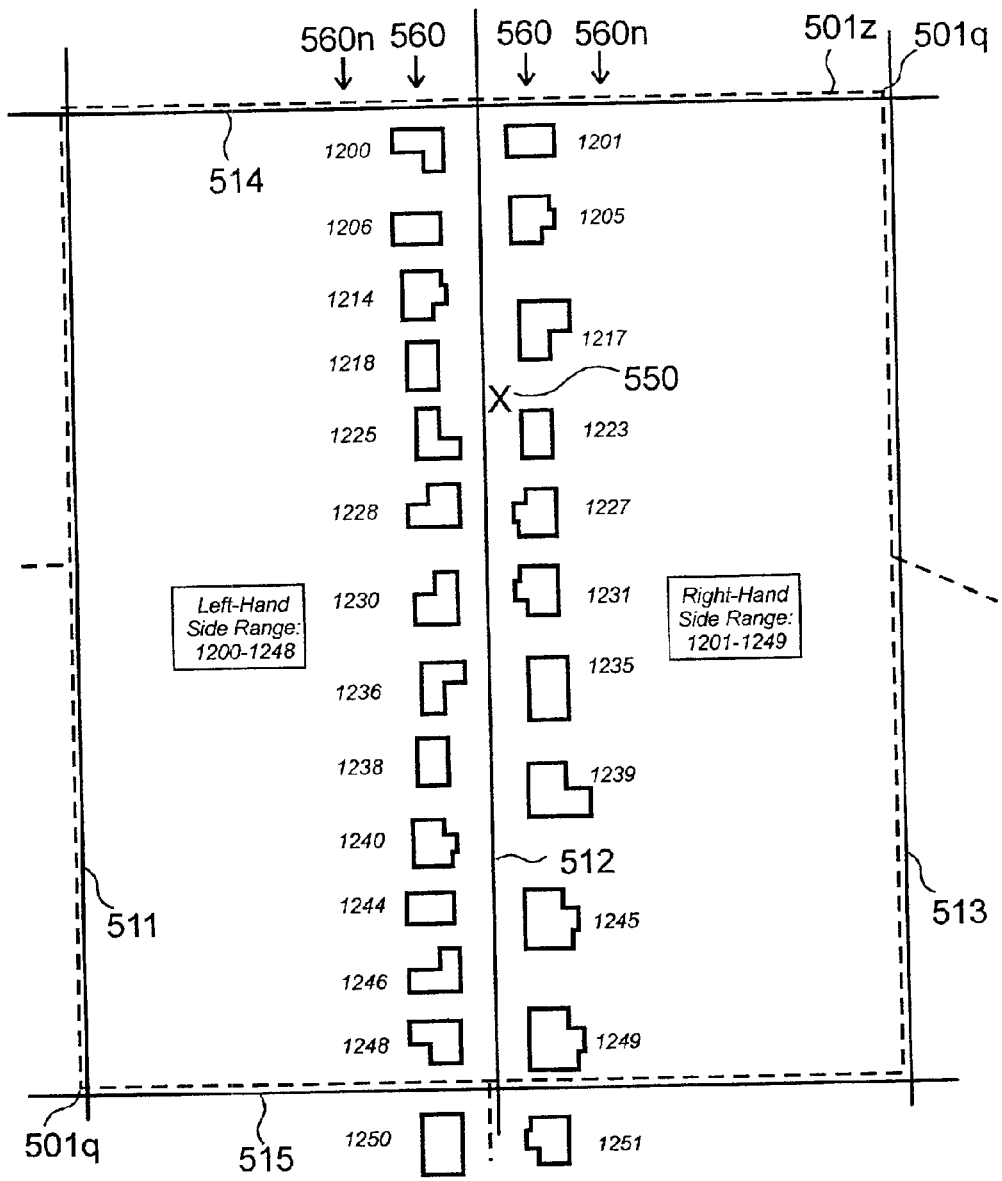
FIG. 2a shows the initial stage of location determination (GLSB) for a caller in a neighborhood.
Figure 2B:
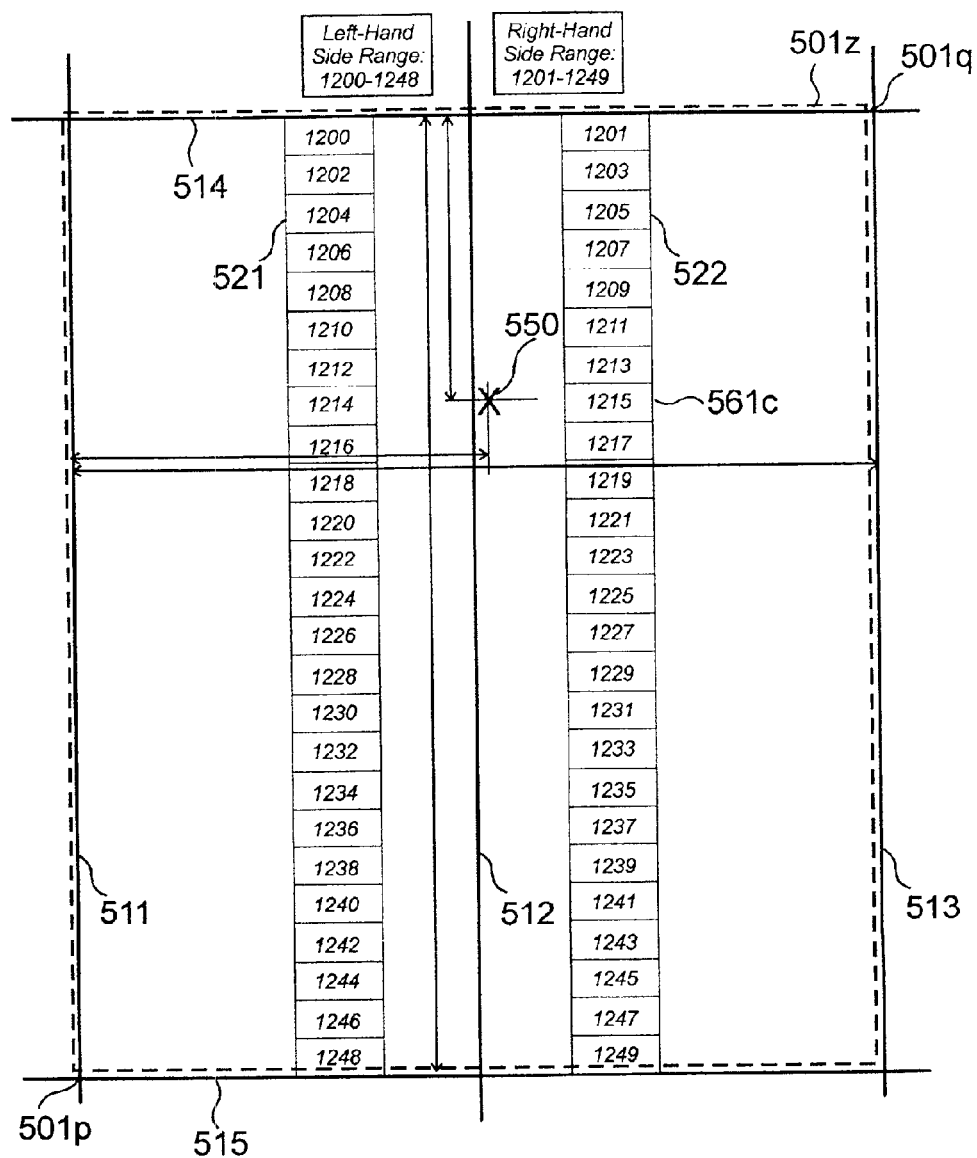
FIG. 2b shows the stage of street address reverse geocoding for a caller in a neighborhood.

FIG. 2a shows an example of a residential neighborhood, with caller location 550, streets 511, 512, 513, and houses 560 having house numbers 560n between streets 514 and 515. Using point-in-polygon processing, the invention selects area 501z containing caller location 550, and having vertex coordinates such as 501p and 501q. As shown in FIG. 2b, the invention applies well-known coordinate geometry rules to determine the street 512 closest to the point of the call. Based on the distance of the point of the call from the two nearest street intersections of the street selected, the invention retrieves the coordinates of the two intersections. The invention assumes linear distribution of addresses 521 and 522 for the left and right sides of the street respectively, selects the right or left set based on the single-axis nearness of location 550 to reference points 501p and 501q, and interpolates a candidate street address 561c for the caller's location. This completes the reverse geocoding step: determining a trial street address from a latitude and longitude. FIG. 2b shows that the candidate building number 1215 was selected.

Figure 2C:
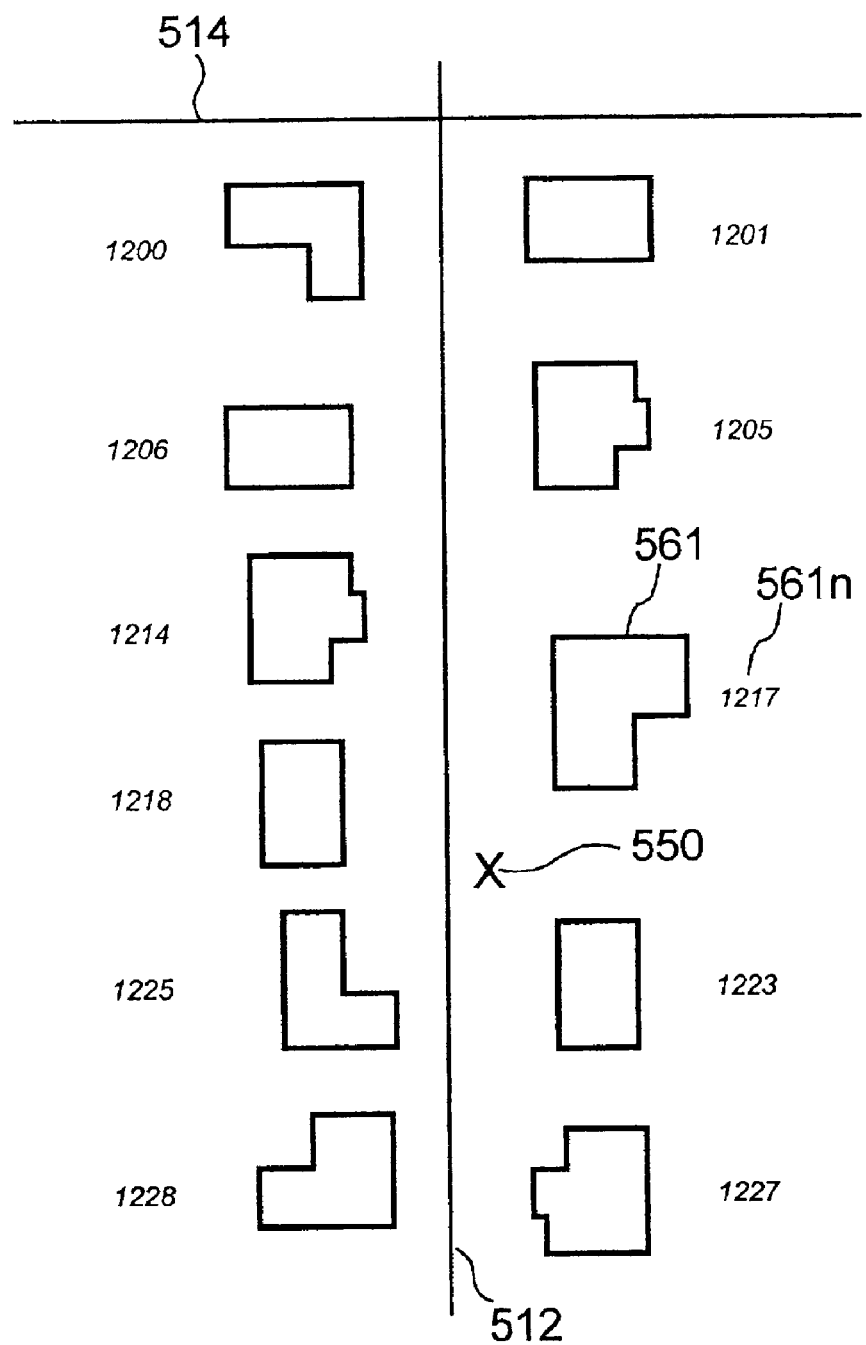
FIG. 2c shows the stage of street address forward geocoding for a caller in a neighborhood.

To validate the candidate address, the invention then uses the spatial database's address information to try to find the address calculated. See FIG. 2c. The spatial database does not contain latitudes and longitudes for all addresses, so an estimation process must be used. If the candidate address is found exactly as estimated, the invention furnishes the address to the caller for use with the Web features of the phone. In the example, the candidate address was not found. In this case, the invention compares the candidate address to all addresses retrieved from the database to try to find the closest match. In this case, the nearest actual building number to 1215 is found at building 561n. The building number there is 1217, and the invention selects for the address location of the caller.

The invention adjusts house or building numbers to match most closely what exists on the street, adds directionals if appropriate, and corrects spelling of the street name. The resulting address is then furnished to the caller for use with the Web features of the phone. In effect, the invention has reverse-geocoded the supplied latitude and longitude to get a candidate address, and then forward-geocoded an actual address to develop a match for the caller.

With its multiple accesses to the database, the GLSB application is designed to complete its processing and return results to the caller within several seconds of receiving the request for address determination. This matches well the level of expected Web browser response time, and is therefore within reasonable caller expectation.

An alternative embodiment of the GLSB application makes the address determination whenever the caller requests an address form fill-in on a Web phone, and posts the address information directly into the browser form. The advent of XML, the extended markup language now in wide use on the World Wide Web, facilitates such automatic transfers of data.

Additional embodiments of the GLSB application embed the entire process of interpreting and forwarding location information in the underlying protocols of the wireless phone system. Under both IS-41 and GSM standards, current wireless systems continually exchange information between phone and cell tower concerning the phone's location, primarily so that a mobile station can determine when it has crossed from one registration area to another, and change its registration. This process is event-driven, by the receipt of a new serving MSC (Mobile Switching Center) identifier by the mobile station. In the additional embodiments, the mobile station is enhanced to poll the LMP periodically to obtain interpreted location information as described for GLSB. The interpreted location information is then passed to the active MSC for use and distribution. The incorporation of already-interpreted location information in this continual process makes the Web-enabled wireless phone a tool for unprecedented access to services and connections with other Web users.

Here is an example of such an embodiment. A commercial firm maintains a security perimeter around a facility, with guards stationed at known points and moving along planned tours of watch. Using Web-based wireless phones, any guard or supervisor can maintain up-to-the-second awareness of the position and status of any other guard.

Following the same model, a social example enables a group engaged in a common search or exploration of an area to maintain constant contact without calls. This is especially useful in a search-and-rescue scenario, when individuals must fan out through a wide area to locate a victim or a desired object. It is also especially useful in forest firefighting, where team coordination often consumes the time and attention of fire fighters. The use of a Web-based system to identify continuously the whereabouts of all members of the team allows the front-line team members to devote all their attention to their work. A coordinator or dispatcher can use a wireless Web phone to locate each team member, call team members to direct movement, and direct resources accurately to members who urgently need them in isolated places. The use of a good geographic database in fighting a forest fire would allow a dispatcher, for example, to examine the phone's display, see the marks corresponding to individuals and teams of workers, and call a fire fighter to say, "There's a team on the ridge above you, about 50 yards straight up the incline. Work toward them."

Performance

The speed of the invention arises out of its coordinated use of high-performance software and hardware techniques to convert the latitude and longitude sent by the PDE into the correct PSAP code, rate zone, or other classification. These techniques include the use of a high-performance spatial index, optimized point-in-polygon and polygon-in-polygon processing, a spatial database stored in high-speed computer memory, and the use of isolation levels in the database to prevent conflicts between fast database retrievals and processor-intensive database maintenance tasks.

The Spatial Index

The first technique is the use of a spatial database with a spatial index, to enable high-speed lookups of data based on latitude and longitude, and even elevation if provided. The spatial database is made up of an index tree and a set of leaf nodes on that tree which contain the data classified by the index. The index tree is in the form of an R-tree, well-known to those skilled in the art of spatial database software.

The R-tree is defined in the software literature. See R-Trees: A Dynamic Index Structure for Spatial Searching, by Antonin Guttman, published in ACM SIGMOD 1984. Briefly, the R-tree is a height-balanced index tree structure similar to a B-tree (also widely known in software literature), made up of index nodes and leaf nodes. Index records are grouped in the nodes of the tree. Each node in the R-tree contains a set of from 2 to 50 index records. In the R-tree's index nodes, each index record contains two coordinate pairs representing opposite corners of what is called a Minimum Enclosing Rectangle, or MER, for a geographic area. The MER is the smallest rectangle, aligned with the coordinate system used in the index, which will enclose (circumscribe) a given geographic area. The geographic area identified in an index entry of the R-tree is the MER containing all of the MERs in the nodes below that node. In the R-tree's leaf nodes, each index record contains a pointer to a polygon definition of a known geographic area such as a ZIP code or an area code.

R-trees are not restricted to two-dimensional spatial definitions. Through the use of three-dimensional coordinates in each index entry, an R-tree may define a minimum enclosing rectangular parallelepiped, defining the limits of a three-dimensional form. This concept generalizes to N dimensions. Consequently the invention's R-tree may optionally store limited geographic elevation data to discriminate between calls originating at different elevations at the same latitude and longitude. An example of such a call would originate in a high-rise building. Assuming that the PDE can provide the necessary coordinates, the invention can return elevation (or floor) data as well as zone or geographic location.

The advantages of R-trees are well-known in the art. Given a pair of coordinates, such as latitude and longitude, an R-tree can return a set of candidate geographic areas with very few probes of the index. Since the invention's index is stored in main memory, the cost of each such probe is on the order of microseconds. This cost does not contribute significantly to the invention's response time delay.

The spatial database index may also take a form derived from the R-tree, such as an R+ tree, an R* tree, a Hilbert R-tree, or an X-tree, all of which represent variations on the basic R-tree structure. The R-tree's characteristics are sufficient for definition of the invention, but different embodiments of the invention may use any similar index forms such as one or more of those listed above. Each method has its own advantages, which can be applied as appropriate. R+ trees offer reduced overlap of minimum enclosing rectangles. R* (R-star) trees offer improved storage (memory) utilization and robustness in processing poor data distributions. Hilbert R-trees offer further improved storage (memory) utilization. X-trees offer improved performance in processing higher-dimensional data. The following references detail the differences among these forms: Guttman A.: 'R-trees: A Dynamic Index Structure for Spatial Searching', Proc. ACM SIGMOD Int. Conf. on Management of Data, Boston, Mass., 1984, pp. 47–57; Sellis T., Roussopoulos N., Faloutsos C.: 'The R+-Tree: A Dynamic Index for Multi-Dimensional 'Objects', Proc. 13th Int. Conf on Very Large Databases, Brighton, England, 1987, pp 507–518; C. Faloutsos and S. Roseman: 'Fractals for secondary key retrieval.' Eighth ACM SIGACT-SIGMOD-SIGART Symposium on Principles of Database Systems (PODS), pages 247–252, March 1989; N. Beckmann, H. -P. Kriegel, R. Schneider, and B. Seeger: 'The r*-tree: an efficient and robust access method for points and rectangles.' ACM SIGMOD, pages 322–331, May 1990; Ibrahim Kamel and Christos Faloutsos: 'Hilbert r-tree: an improved r-tree using fractals' pp 500–509, Proc. 20th Int. Conf. on Very Large Databases, Santiago, Chile, 1994; and Stefan Berchtold, Daniel A. Keim, and Hans-Peter Krieger: 'The X-tree: An Index Structure for High-Dimensional Data' Proc. 22nd Int. Conf. on Very Large Databases, Brighton, England, 1996, pp 406–415.

To give an overview of the spatial indexing process with an R-tree, the input area's MER is determined at the outset.

Then the incoming area's MER is compared to the MERs in the index, and a set of candidate geographic areas are found wherever the input MER overlaps with an MER in the index. Comparing one MER to another is a simple set of numeric operations on the four corners of each MER. If there is no overlap, then there is no possible crossing, and the invention immediately returns a negative result. If there is overlap of the incoming MER and a database MER, the algorithm checks the overlapping area to see if it is smaller than either of the MERs involved. If the overlapped area is smaller, the algorithm restricts the area of analysis to the overlapped area only. Next, the invention's point-in-polygon or polygon-in-polygon processing determines the relationship between the actual incoming area and the relevant portions of the geographic areas defined in the spatial database. If an intersection with a contour from the database does fall between adjacent points defined for the input, then a crossing has been found, and the input area overlaps with the area found in the database.

Here is a detailed example of R-tree spatial index processing. See FIG. 3a, which is adapted from the original Guttman paper. The minimum enclosing rectangles are shown as rectangles which overlap and nest within each other. The geographic zones are shown as the irregular polygonal shapes inside the lowest-level rectangles. The root record of the R-tree index contains the largest MERs 201 and 202, each one containing a set of smaller MERs. MER 201 contains MERs 211, 212 and 213. MER 202 contains MERs 214 and 215. In turn, MER 211 contains MERs 221, 222 and 223, each of which contains only a geographic zone. MERs 224, 225, 226, 227, 228, 229, 230, 301, 302, and 303 also contain only geographic zones. A single area may have separate parts, as in MER 230.

Figure 3A:
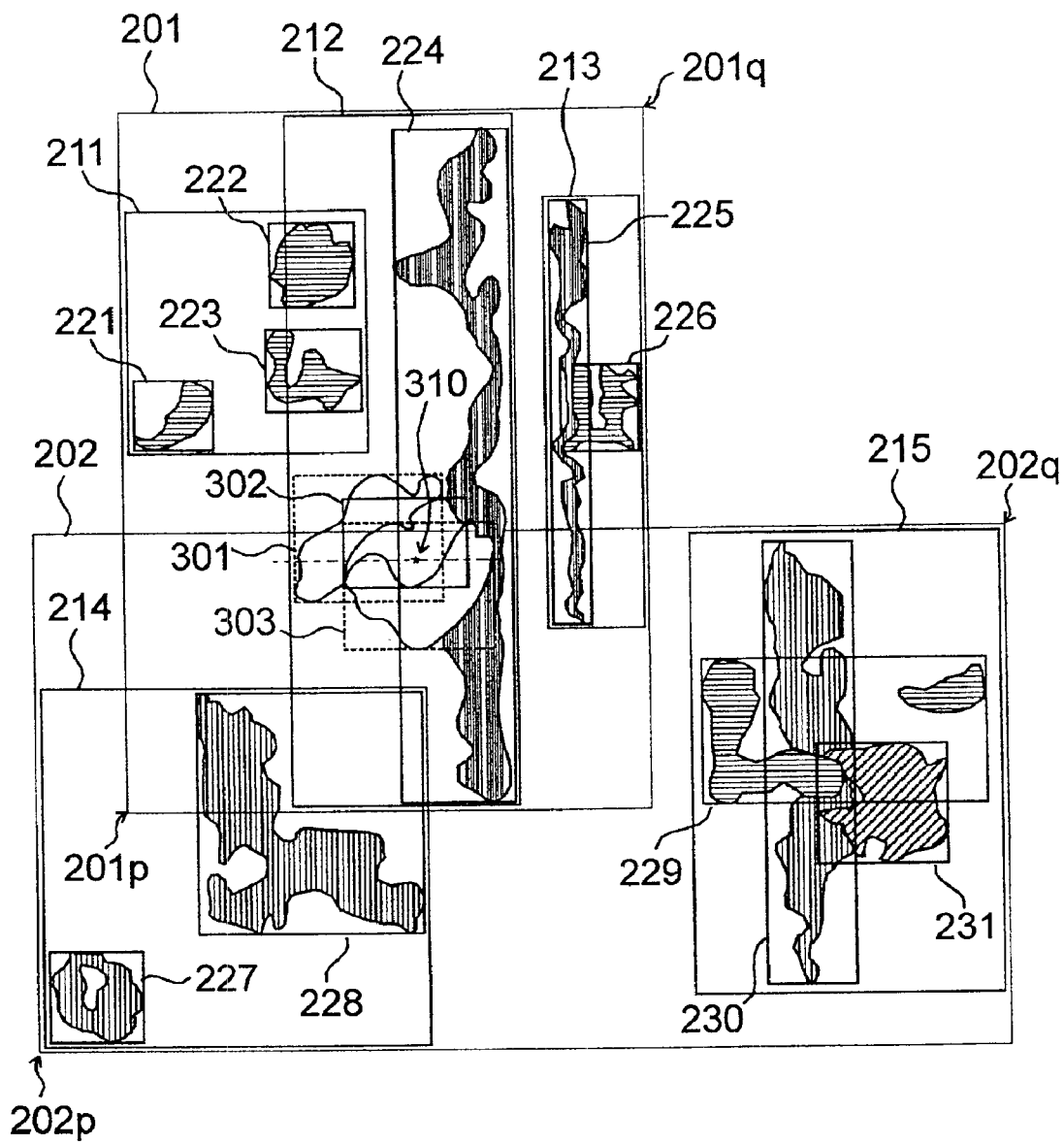
FIG. 3a shows geographic areas, and a point to be located, in the nest of minimum enclosing rectangles (MERs) as defined in an R-tree index.

In FIG. 3a, a point 310 is shown as the input point for which the geographic zone is to be found. To determine the geographic zone for point 310, the lookup process begins at the root of the R-tree with MERs 201 and 202. By comparing the coordinates for points 201p and 201q to those for point 310, the process determines that point 310 is within MER 201. Likewise, by comparing the coordinates for points 202p and 202q to those for point 310, the process determines that point 310 is within MER 202 as well. The process then descends to the next level of the index tree, in which all MERs within the MER 201 branch and all MERs within the MER 202 branch are stored. Checking MERs in these two branches of the index tree results in finding that point 310 appears only in MER 212. The process then descends to the next level of the index tree to retrieve only the MERs in MER 212, namely MERs 224, 301, 302 and 303. Point 310 is found to be within all four. Since all of these MERs contain only geographical areas defined as polygons, the process shifts from the index selection and retrieval to the point-in-polygon determination.

Figure 3B:
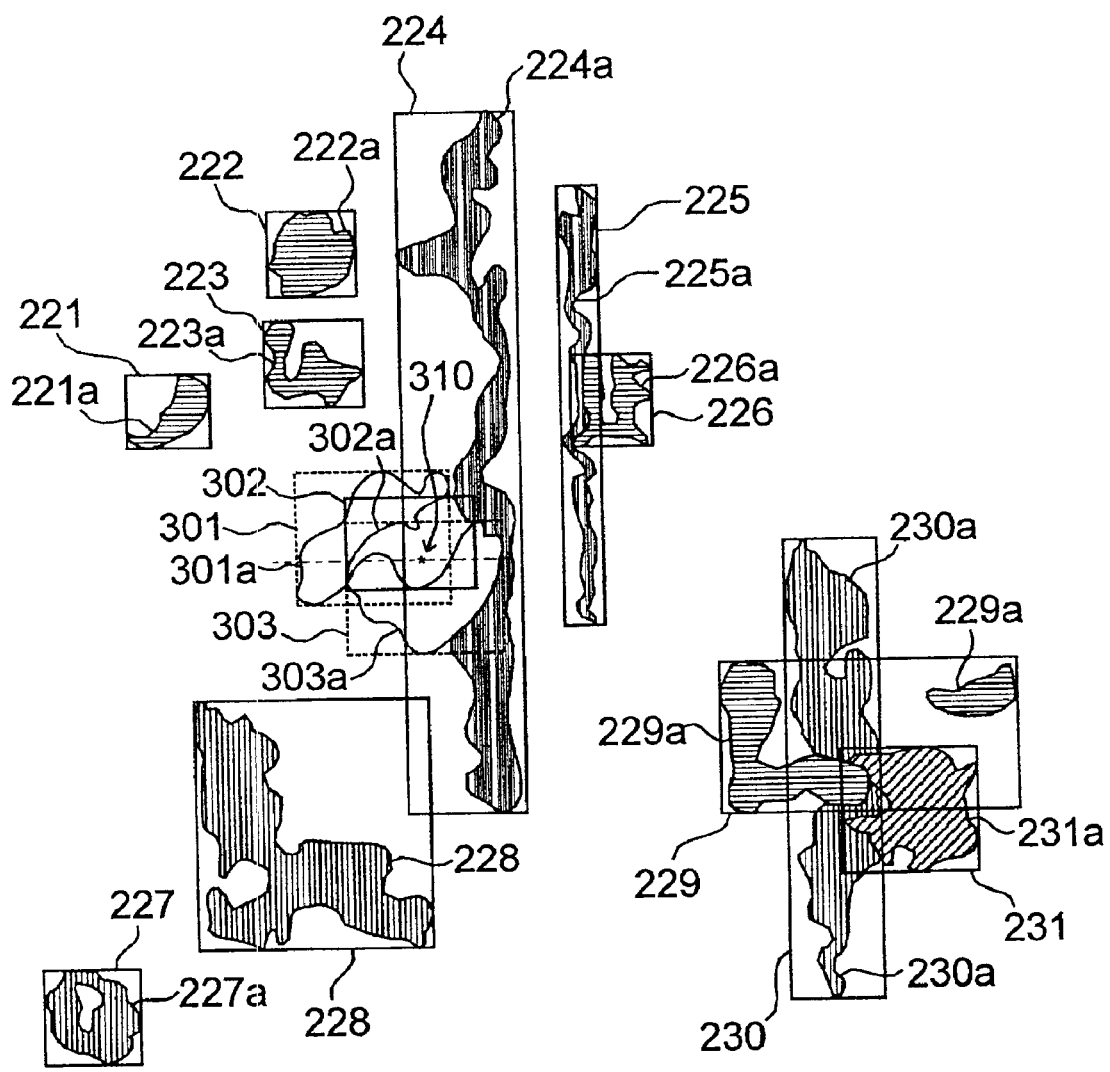
FIG. 3b shows geographic areas, and a point to be located, in the lowest level of minimum enclosing rectangles (MERs) as defined in an R-tree index.
Figure 3C:
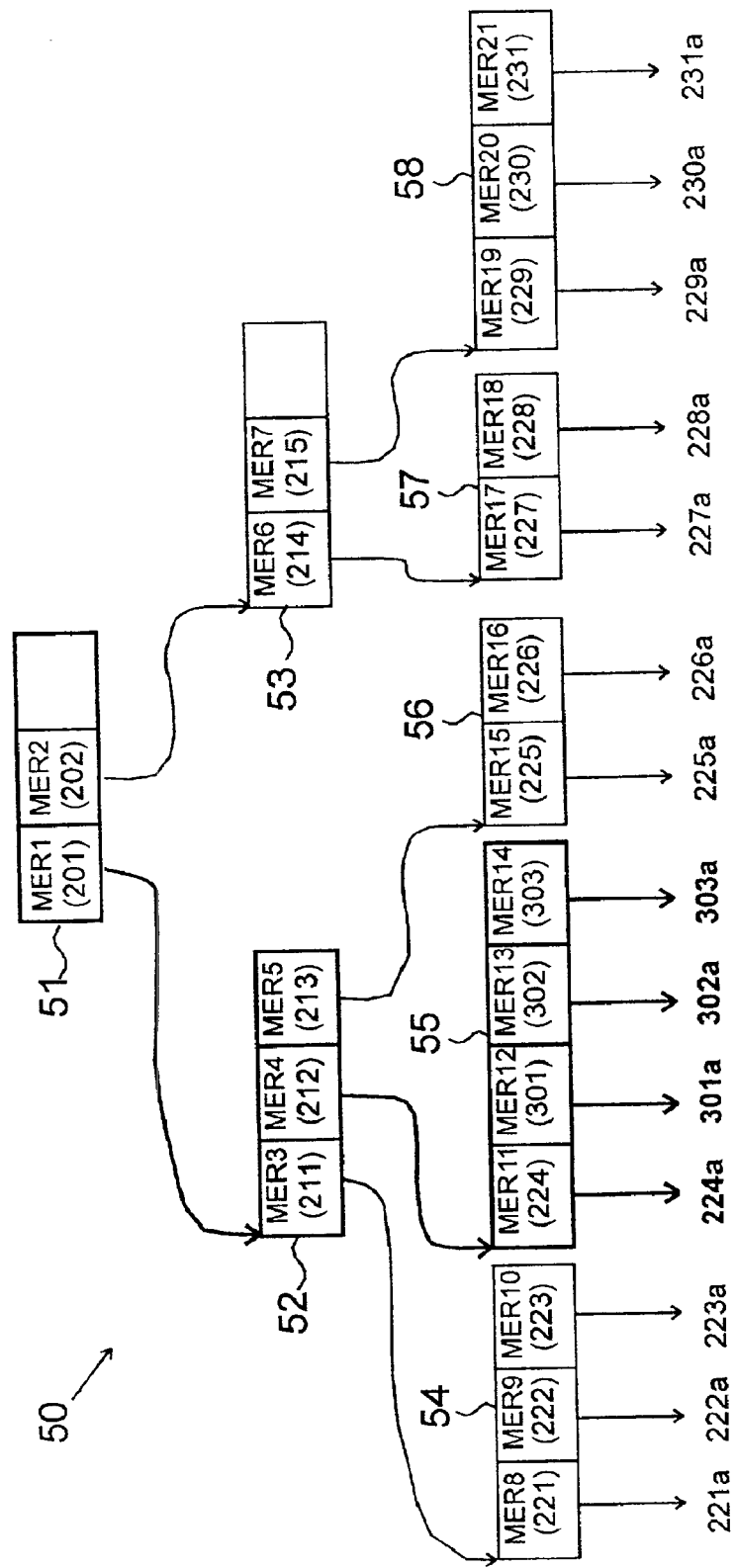
FIG. 3c shows the structure of the R-tree index for the MERs and geographic areas in FIGS. 4a and 4b.

In an alternative view of the process, FIG. 3c diagrams the descent from the root node 51 of the R-tree 50. Note that nodes 53, 54, 56, 57, and 58 are not accessed, and no areas are accessed from the leaf nodes except for areas 224a, 301a, 302a, and 303a.

The process illustrated is for far fewer nodes overall than any real case. In a real situation, root node 51 would have up to 50 nodes directly beneath it, and the same would hold true for each node at subsequent lower levels of the tree. Even with tens of thousands of nodes, the descent of such a "bushy" tree would normally require very few MER comparisons. If it is assumed that each node contains 30 MERs, only one or two nodes on each level of the index tree would be accessed. An R-tree index supporting a seven-million-polygon spatial database with 30 MERs per node would require five levels of index, so that in general the MERs in about ten nodes would require comparison with the input point.

The advantages of the R-tree become even more evident once the MER screening has eliminated most of the database's geographical areas from the screening process. So far, the example process has required only rapid point-MER comparisons for MERs 201, 202, 211, 212, 213, 214, and 215. Lengthier point-in-polygon processing is required only for geographic areas 224a, 301a, 302a, and 303a within MER 212. See FIG. 3b, which shows the same areas as in FIG. 3a, with the higher-level MERs removed, and the geographic areas identified. The R-tree's leaf nodes contain the detailed polygon data for shapes within the MERs. In a real-world database, only a handful of geographic areas would require point-in-polygon processing, just as in the example.

Point-in-Polygon and Polygon-in-Polygon Processing

The second technique used to make the invention work faster is optimized point-in-polygon or polygon-in-polygon processing. This processing determines the relationship between an incoming latitude and longitude or area, and one or more specific, defined, geographic areas in the spatial database. In the polygon-in-polygon case, the input is not a single point, but an area, defined as a polygon of points.

Figure 4A:
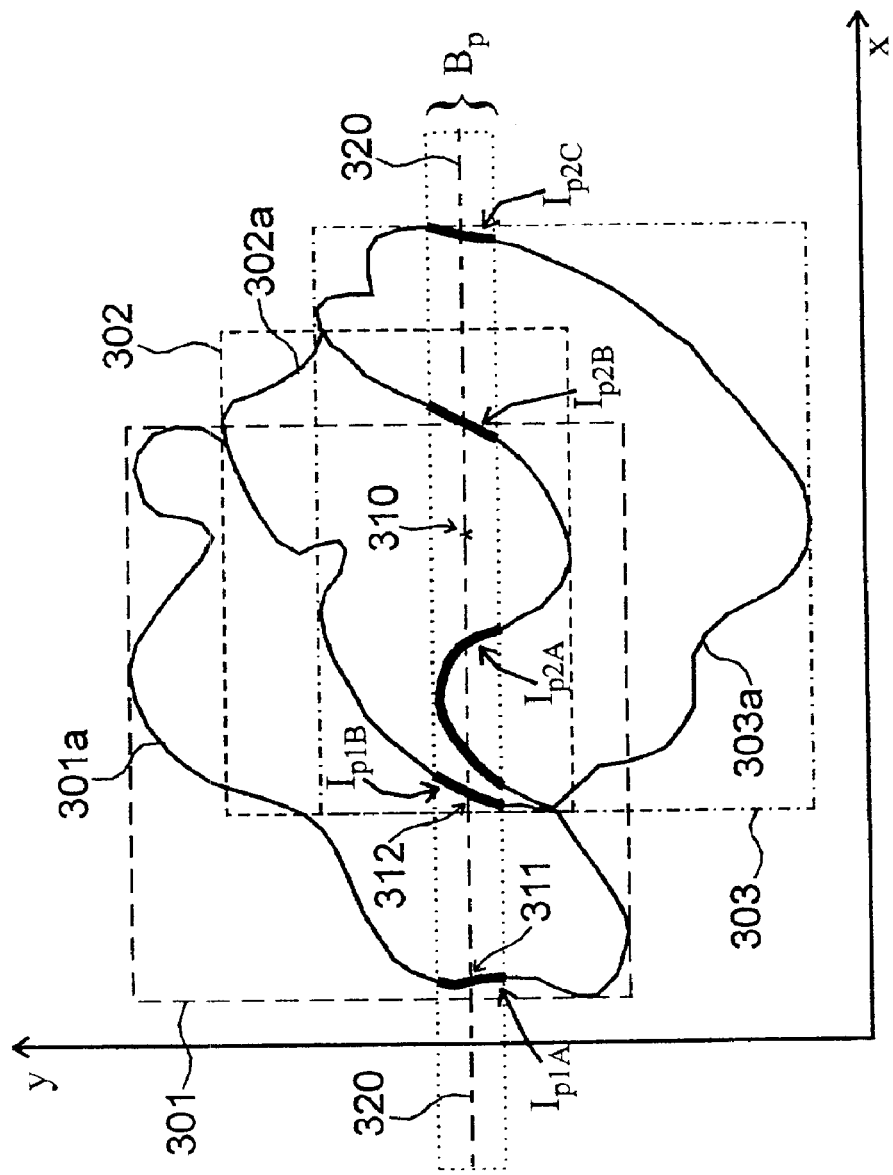
FIG. 4a shows a detailed subset of the geographic areas in FIGS. 4a and 4b, and a point to be located among the areas using point-in-polygon processing.

For the point-in-polygon processing, see FIG. 4a. The method used by the invention is an application of Jordan's Theorem, which states that a closed contour in a Euclidean plane divides the plane into two separate areas (call them an "outside" and an "inside"). A point can be determined to be inside or outside of a closed contour by 1) extending a line (ray) straight out from the point past the outermost reach of the contour, 2) counting the crossings the extending line makes with the contour, 3) calling all points with an odd number of such crossings "inside" the contour, and 4) calling all points with an even number of such crossings "outside" the contour. In the present example, point 310 is in the MER box 301 for area 301a. Extend a horizontal line 320 from point 310 to either left or right. Define box $B_p$, essentially a narrow neighborhood to either side of the horizontal line 320, to restrict the number of points of the area contour which must be compared versus line 320. Box $B_p$ defines edge segments $I_{p1A}$, $I_{p1B}$, $I_{p2A}$, $I_{p2B}$, and $I_{p2C}$, each containing a small number of polygon points for the areas in question. To find whether point 310 is inside or outside area 301a, count intersections 311, 312 of line 320 with the edge segments $I_{p1A}$ and $I_{p1B}$ of area 301a, going to the left only. Counting stops once the edge of MER 301 has been passed (clearly, no further points of area 301a can exist beyond this point). If the count is even, point 310 is outside area 301a. If the count is odd, point 310 is inside area 301a. Here the count is even, so point 310 is outside area 301a.

With area 303a, $I_{p2A}$ doesn't intersect both sides of box $B_p$, so it is not counted as crossing line 320. $I_{p2B}$ and $I_{p2C}$ do intersect line 320, giving an even value (2) for the intersection count, and therefore showing point 310 to be outside area 303a. With area 302a, $I_{p1B}$ and $I_{p2B}$ both intersect with line 320, and $I_{p2A}$ is again ignored, but only one direction (left or right) is considered from point 310. Whether the direction chosen is left or right, the count proves to be 1 (odd), showing that point 310 is inside area 302a.

Figure 4B:
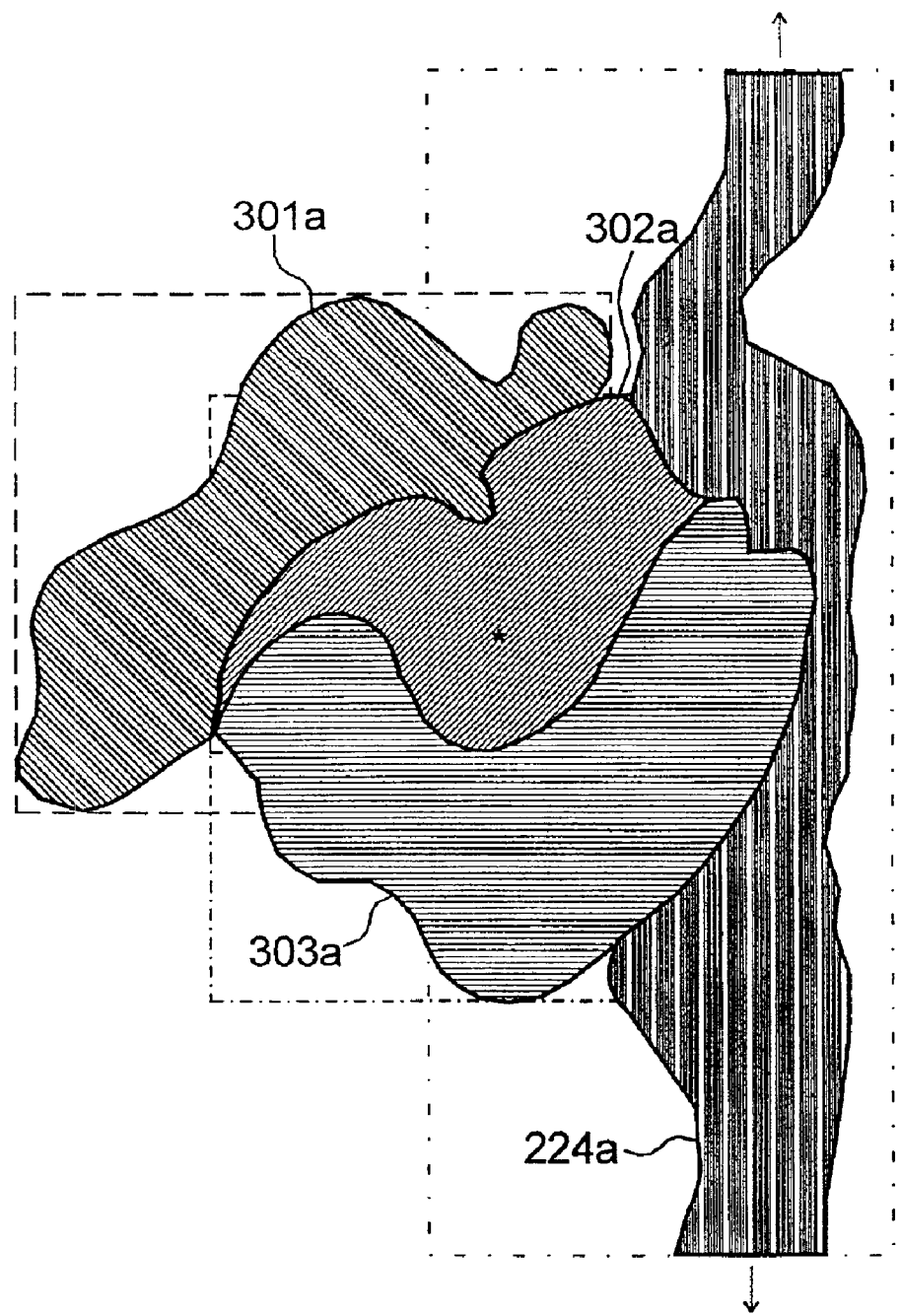
FIG. 4b shows an expanded and highlighted set of the geographic areas in FIG. 4a, and a point to be located among them using point-in-polygon processing.

Area 224a, which is too large to include in FIG. 4a, is also listed under MER 224, which is in MER 212. See FIG. 4b, which shows the four areas, 301, 302, 303 and 224, all of which require point-in-polygon analysis for point 310. By the same process as for areas 301, 302, and 303, point 310 is shown to be outside area 224a.

Note that there is no need to extend line 320 beyond the candidate MERs in either direction. This treatment, as it operates in the invention, covers both point-in-polygon and polygon-in-polygon, and treats all boundary cases correctly. Special cases, such as how to define a crossing when a ray touches a contour in one point that may be a vertex or a point of tangency, require some additional processing, but do not substantially change the impact of the method used. Boundary points are special cases, each requiring definition of rules to ensure consistent behavior of the algorithm. The processing performed is topologically correct.

The polygon-in-polygon case treats adjacent points from the input polygon one by one, and uses point-in-polygon processing to determine whether the adjacent points are both inside, both outside, or straddling the contour of the area being compared to the input.

The Memory-Stored Database

The third technique used in the invention for fast response times is the storage and management of the entire spatial index in high-speed memory, to remove all mass storage access overhead from the lookup process. The spatial database itself is stored on mass storage devices as a relational (and spatial) database, using a commercial database management system (DBMS). The direct use of a commercial DBMS presents two problems which the invention overcomes.

The first DBMS problem is access time. The spatial database is stored and maintained by the DBMS on disk-type mass storage. Retrieval of index and data records from mass storage is time-consuming, and requires constant attention to database tuning to insure the optimum access time. The invention solves this problem by the use of a transformation program which converts the disk-stored form of the database into a more compact, memory-stored form which requires no disk-access software operation. This form of the database is loaded onto a single system. From there it provides immediate memory access to all spatial index nodes and records, and to all spatial data required. Any and all network latency inherent in many DBMSs is eliminated. In this way the tens to hundreds of milliseconds required to retrieve one node shrink to tens to hundreds of microseconds, a thousandfold increase in speed.

The invention preserves and amplifies this speed advantage by implementing the processing of spatial predicates in its queries against the memory-stored data. Spatial predicates are language constructs designed for querying spatial databases to determine the relationships between geometric shapes. A typical set of spatial predicates in OpenGIS SQL are:

| | |
|---|---|
| Equals (g1, g2) | Returns a value of 1 for TRUE, 0 for FALSE, and −1 for UNKNOWN. TRUE if g1 and g2 are equal. |
| Disjoint (g1, g2) | Returns a value of 1 for TRUE, 0 for FALSE, and −1 for UNKNOWN. TRUE if the intersection of g1 and g2 is empty. |
| Touches (g1, g2) | Returns a value of 1 for TRUE, 0 for FALSE, and −1 for UNKNOWN. TRUE if the only points in common between g1 and g2 lie in the union of the boundaries of g1 and g2. |
| Within (g1, g2) | Returns a value of 1 for TRUE, 0 for FALSE, and −1 for UNKNOWN. TRUE if g1 is completely contained in g2. |
| Overlaps (g1, g2) | Returns a value of 1 for TRUE, 0 for FALSE, and −1 for UNKNOWN. TRUE if the intersection of g1 and g2 results in a value of the same dimension as g1 and g2 that is different from both g1 and g2. |
| Crosses (g1, g2) | Returns a value of 1 for TRUE, 0 for FALSE, and −1 for UNKNOWN. TRUE if the intersection of g1 and g2 results in a value whose dimension is less than the maximum dimension of g1 and g2 and the intersection value includes points interior to both g1 and g2, and the intersection value is not equal to either g1 or g2. |
| Intersects (g1, g2) | Returns a value of 1 for TRUE, 0 for FALSE, and −1 for UNKNOWN. This is a convenience predicate: TRUE if the intersection of g1 and g2 is not empty. Intersects(g1, g2) implies Not (Disjoint(g1, g2)) |
| Contains (g1, g2) | Returns a value of 1 for TRUE, 0 for FALSE, and −1 for UNKNOWN. This is a convenience predicate: TRUE if g2 is completely contained in g1. Contains(g1, g2) implies Within(g2 , g1) |

The second DBMS problem is the negative effect on retrieval performance which occurs whenever the database is undergoing extensive updating or backup. Even with the best of tuning, database maintenance consumes a major part of a system's processing resources. If retrievals for location determination happen to occur during database updating, they can suffer significant delays. The DBMS cure for this is to add more retrieval processing resources, which significantly increases the cost of the system. The invention avoids this problem by isolating the retrieval process to its own memory-stored form of the spatial database, while DBMS maintenance goes on in the disk-stored form of the database. The DBMS processing overhead for database maintenance is therefore isolated to parts of the system not involved in the online retrieval process.

The net result of these database improvements is sub-second response time for its queries during operation.

Database Isolation Levels

The fourth technique used in the invention to sustain fast response times is the use of isolation levels in the spatial database to allow high-speed retrieval of information from the spatial database to continue unaffected while sections of that database are undergoing updating. At intervals, the memory-stored form of the database must be updated. The invention accomplishes this without significant performance penalty on retrievals by 1) isolating a segment of the index tree with that segment's underlying data being updated, 2) creating a new version of just the updated portion of the tree and data, and 3) switching the retrievals to the new version of that portion at one time. The space used by the old version can then be freed for further use in updating. Since this can be done for subtrees of the database, the entire database need not be fully replicated in memory in both an old and a new version. In this manner the invention avoids penalizing the retrieval process during updating.

Scalability

Out of the combination of all these performance-related innovations, the invention derives an added major advantage in its architecture: it is scalable to support the use of any size of spatial database using latitude, longitude and limited elevation. The compaction of the spatial database into its index nodes and leaf nodes in memory strips out all DBMS-required overhead information. The use of MERs and R-tree design also reduce the incremental database space requirements dramatically. These factors allow the disk-stored DBMS level of the database to be nearly any size desired, while the growth rate of the memory-stored level remains relatively small. Only the information essential to the retrieval operation is stored in memory, in a compact form.

As the database size scales up, R-tree spatial indexing sustains high performance. Even when the database size requires the addition of a tier of index records, the memory-based traversal of the added tier of records adds very little cost to the overall access.

For example, see Table 1 below, titled R-Tree Space Calculations. These calculations show that a database of seven million two-dimensional geographical areas of a maximum size of 100 kilometers each, stored as 100-point polygons with an R-tree index, can be stored in full in about two gigabytes of memory. Simple, well-known compression techniques are applied in this estimate, and reduce the overall size significantly, thereby allowing the storage and retrieval of larger numbers of more-complex shapes in the same range of memory. Further use of compression, such as an assumed coordinate baseline on a smaller-than-global scale, can reduce the memory need still more. Main memory sizes in the 2-gigabyte range are easily configured in current computer systems.

TABLE 1

| R-Tree Space Calculations | | Index Node Level | # of Index Nodes at Level |
|---|---|---|---|
| Number of data recs (leaf nodes) | 7000000 | 1 | 233334 |
| Maximum index records per node | 50 | 2 | 7778 |
| Bytes per R-tree index MER* | 8 | 3 | 260 |
| Bytes per R-tree index pointer | 8 | 4 | 9 |
| Bytes per R-tree index node (ovhd) | 16 | 5 | 0 |
| Bytes per R-tree leaf node (ovhd) | 16 | 6 | 0 |
| Index node occupancy | 60% | 7 | 0 |
| Mean polygon points per area | 100 | 8 | 0 |
| Overall area scale (km) | 100 | 9 | 0 |
| | | Total | 241382 |
| Index records per node | 30 | | |
| Bytes per R-tree index node | 496 | | |
| Number of index nodes | 241382 | | |
| Index node space | 119725472 | 114.18 MB | |
| Bytes per leaf node | 269 (from compression calculations in Table 2) | | |
| Leaf node space | 1883000000 | 1795.77 MB | |
| Total Database Space (Leaves and Index) | 2002725472 | 1909.95 MB | |

If multiple sets of zone and location information are required for the same geographic area, the invention's system can be "layered", installing one system for each distinct class of areas and data content. For example, given a state or province, one system would contain the spatial data and index for PSAPs, and another system would contain the spatial data and index for rate zones and similar information. Such splitting allows wider system coverage than if all spatial index and data content of all types had to be stored in a single system.

Conclusions, Ramifications, and Scope of Invention

From the above descriptions, figures and narratives, the invention's advantages in supplying spatial area and location identifiers from latitude and longitude inputs should be clear. The invention is easily scalable to databases encompassing continental and global areas without significant impact on system architecture, and without significant degradation of response time. The use of memory-based spatial-index software technology takes advantage of the technology curve of growing memory sizes and capacities and increased memory speeds, thereby amplifying the invention's scalability and insuring its continued high performance. The isolation of the memory-stored database from its relational source database protects the performance of the invention while maintaining its flexibility in handling diverse sources of data and varying database management requirements.

Although the description, operation and illustrative material above contain many specificities, these specificities should not be construed as limiting the scope of the invention but as merely providing illustrations and examples of some of the preferred embodiments of this invention.

Thus the scope of the invention should be determined by the appended claims and their legal equivalents, rather than by the examples given above.

What is claimed is:

1. An apparatus to determine, within an acceptable time of setup of a wireless telephone call, a classification of a geographic point, comprising:

a computer system in turn comprising one or more mass storage subsystems, one or more main memory subsystems, one or more interconnected processors, and one or more connections to a telephone network;

a first database stored in one or more of the mass storage subsystems and containing a set of all classifications used, wherein each member of the set identifies a distinct classification of a geographical area and its geographical boundaries;

a second database stored in one or more of the main memory subsystems and containing all information from the first database necessary to determine the classification of a geographic point using the geographic point's coordinates;

a retrieval program, operating within one or more of the processors, whereby the geographic point's classification is found within the second database and retrieved for use.

2. The apparatus of claim 1 wherein the retrieval program further comprises:

a spatial index retrieval program;

a point-in-polygon determination program for deciding whether a given point falls within a given classification polygon;

a polygon-in-polygon determination program for deciding whether a given first polygon falls within a given second classification polygon, falls outside the second classification polygon, overlaps the second classification polygon, or shares a vertex or boundary with the second classification polygon;

a program means for returning the identity of the determined classification for use.

3. The apparatus of claim 2 further comprising a first conversion program, operating within one or more of the processors, whereby the geographic point's latitude and longitude are converted to coordinates uniquely locating the geographic point in a coordinate system used in the second database.

4. The apparatus of claim 3 further comprising a second conversion program, operating within one or more of the processors, whereby the geographic point's latitude, longitude, and elevation are converted to coordinates uniquely locating the geographic point in a coordinate system used in the second database.

5. The apparatus of claim 4 wherein each classification comprises geocoded data.

6. The apparatus of claim 5 wherein each classification comprises one of a set of Public Safety Answering Points (PSAPs).

7. The apparatus of claim 5 wherein each classification comprises one of a set of telephone company rate zones.

8. The apparatus of claim 5 wherein each classification comprises one of a set of wireless communication service areas.

9. The apparatus of claim 5 wherein each classification comprises one of a set of commercial franchise areas.

10. The apparatus of claim 5 wherein each classification comprises one of a set of commercial service zones.

11. The apparatus of claim 5 wherein each classification comprises a service area classification.

12. The apparatus of claim 5 wherein the second database further comprises:
   a spatial index of recursively nested geographical regions;
   a base table associating each region with one or more classifications.

13. The apparatus of claim 12 wherein the base table of the second database comprises the leaf nodes of the spatial index.

14. The apparatus of claim 12 wherein the spatial index of the second database comprises an R-tree index.

15. The apparatus of claim 12 wherein the spatial index of the second database comprises an R*-tree (R-star tree) index.

16. The apparatus of claim 12 wherein the spatial index of the second database comprises an R+-tree (R-plus tree) index.

17. The apparatus of claim 12 wherein the spatial index of the second database comprises a Hilbert R-tree index.

18. The apparatus of claim 12 wherein the spatial index of the second database comprises an X-tree index.

19. The apparatus of claim 5 further comprising a loading program, operating within one or more of the processors, whereby the geographic boundary classification contents of the first database are loaded into the second database without interfering substantially with the functioning or the speed of the retrieval program.

20. The apparatus of claim 19 wherein the loading program loads the geographic boundary classification contents of the first database into the second database in a more-compact form to save memory space.

21. The apparatus of claim 1 further comprising an interface program, operating within one or more of the processors, whereby the geographic point may be obtained from a requesting entity and the classification of that point returned to the requesting entity.

22. The apparatus of claim 1 wherein an acceptable time of setup of a wireless telephone call must be less than one second.

23. A location management platform apparatus to determine, within an acceptable time of setup of a wireless telephone call, a classification of a geographic point, comprising:
   a computer system in turn comprising one or more mass storage subsystems, one or more main memory subsystems, one or more interconnected processors, and one or more connections to a telephone network;
   a first database stored in one or more of the mass storage subsystems and containing a set of all classifications used, wherein each member of the set identifies a distinct classification of a geographical area and its geographical boundaries;
   a second database stored in one or more of the main memory subsystems and containing all information from the first database necessary to determine the classification of a geographic point using the geographic point's coordinates;
   a retrieval program, operating within one or more of the processors, whereby the geographic point's classification is found within the second database and retrieved for use.

24. The location management platform apparatus of claim 23 wherein the retrieval program further comprises:
   a spatial index retrieval program;
   a point-in-polygon determination program for deciding whether a given point falls within a given classification polygon;
   a polygon-in-polygon determination program for deciding whether a given first polygon falls within a given second classification polygon, falls outside the second classification polygon, overlaps the second classification polygon, or shares a vertex or boundary with the second classification polygon;
   a program means for returning the identity of the determined classification for use.

25. The location management platform apparatus of claim 24 further comprising a first conversion program, operating within one or more of the processors, whereby the geographic point's latitude and longitude are converted to coordinates uniquely locating the geographic point in a coordinate system used in the second database.

26. The location management platform apparatus of claim 25 further comprising a second conversion program, operating within one or more of the processors, whereby the geographic point's latitude, longitude, and elevation are converted to coordinates uniquely locating the geographic point in a coordinate system used in the second database.

27. The location management platform apparatus of claim 26 wherein each classification comprises geocoded data.

28. The location management platform apparatus of claim 27 wherein each classification comprises one of a set of Public Safety Answering Points (PSAPs).

29. The location management platform apparatus of claim 27 wherein each classification comprises one of a set of telephone company rate zones.

30. The location management platform apparatus of claim 27 wherein each classification comprises one of a set of wireless communication service areas.

31. The location management platform apparatus of claim 27 wherein each classification comprises one of a set of commercial franchise areas.

32. The location management platform apparatus of claim 27 wherein each classification comprises one of a set of commercial service zones.

33. The location management platform apparatus of claim 27 wherein each classification comprises a service area classification.

34. The location management platform apparatus of claim 27 wherein the second database further comprises a spatial index of recursively nested geographical regions and a base table associating each region with one or more classifications.

35. The location management platform apparatus of claim 34 wherein the base table of the second database comprises the leaf nodes of the spatial index.

36. The location management platform apparatus of claim 34 wherein the spatial index of the second database comprises an R-tree index.

37. The location management platform apparatus of claim 34 wherein the spatial index of the second database comprises an R*-tree (R-star tree) index.

38. The location management platform apparatus of claim 34 wherein the spatial index of the second database comprises an R+-tree (R-plus tree) index.

39. The location management platform apparatus of claim 34 wherein the spatial index of the second database comprises a Hilbert R-tree index.

40. The location management platform apparatus of claim 34 wherein the spatial index of the second database comprises an X-tree index.

41. The location management platform apparatus of claim 27 further comprising a loading program, operating within one or more of the processors, whereby the geographic boundary classification contents of the first database are loaded into the second database without interfering substantially with the functioning or the speed of the retrieval program.

42. The location management platform apparatus of claim 41 wherein the loading program loads the geographic boundary classification contents of the first database into the second database in a more-compact form to save memory space.

43. The location management platform apparatus of claim 23 wherein an acceptable time of setup of a wireless telephone call must be less than one second.

44. An apparatus to determine, within an acceptable caller waiting time during a wireless telephone call, a geographic point, comprising:
   a computer system in turn comprising one or more mass storage subsystems, one or more main memory subsystems, one or more interconnected processors, and one or more connections to a telephone network;
   a first database stored in one or more of the mass storage subsystems and containing the set of all classifications used, wherein each member of the set identifies a distinct classification of a geographical area and its geographical boundaries;
   a second database stored in one or more of the main memory subsystems and containing all information from the first database necessary to determine the classification of a geographic point using said point's coordinates;
   a retrieval program, operating within one or more of the processors, whereby the geographic point's location identifier may be estimated using known reference points in the second database.

45. The apparatus of claim 44 wherein the retrieval program further comprises:
   a spatial index retrieval program;
   a point-in-polygon determination program for deciding whether a given point falls within a given classification polygon;
   a polygon-in-polygon determination program for deciding whether a given first polygon falls within a given second classification polygon, falls outside the second classification polygon, overlaps the second classification polygon, or shares a vertex or boundary with the second classification polygon;
   a program means for returning the identity of the determined classification for use.

46. The apparatus of claim 45 further comprising a first conversion program, operating within one or more of the processors, whereby the geographic point's latitude and longitude are converted to coordinates uniquely locating the geographic point in a coordinate system used in the second database.

47. The apparatus of claim 46 further comprising a second conversion program, operating within one or more of the processors, whereby the geographic point's latitude, longitude, and elevation are converted to coordinates uniquely locating the geographic point in a coordinate system used in the second database.

48. The apparatus of claim 47 wherein each classification comprises geocoded data.

49. The apparatus of claim 48 wherein the location identifier comprises a street address.

50. The apparatus of claim 48 wherein the second database further comprises a spatial index of recursively nested geographical regions and a base table associating each region with one or more classifications.

51. The apparatus of claim 50 wherein the base table of the second database comprises the leaf nodes of the spatial index.

52. The apparatus of claim 50 wherein the spatial index of the second database comprises an R-tree index.

53. The apparatus of claim 50 wherein the spatial index of the second database comprises an R*-tree (R-star tree) index.

54. The apparatus of claim 50 wherein the spatial index of the second database comprises an R+-tree (R-plus tree) index.

55. The apparatus of claim 50 wherein the spatial index of the second database comprises a Hilbert R-tree index.

56. The apparatus of claim 50 wherein the spatial index of the second database comprises an X-tree index.

57. The apparatus of claim 48 further comprising a validation program, operating within one or more of the processors, whereby the estimated geographic location identifier is validated by comparison to known geographic location identifiers in the second database.

58. The apparatus of claim 48 further comprising a loading program, operating within one or more of the processors, whereby the geographic boundary classification contents of the first database are loaded into the second database without interfering substantially with the functioning or the speed of the retrieval program.

59. The apparatus of claim 58 wherein the loading program loads the geographic boundary classification contents of the first database into the second database in a more-compact form to save memory space.

60. The apparatus of claim 48 further comprising an interface program, operating within one or more of the processors, whereby the geographic point may be obtained from a requesting entity and the location identifier of that point returned to the requesting entity.

61. The apparatus of claim 44, wherein an acceptable caller waiting time during a wireless telephone call must be less than five seconds.

62. A method of determining, within an acceptable time of setup of a wireless telephone call, a classification of a geographic point using said point's geographic latitude and longitude, comprising the steps of:
   accepting from a requesting entity a latitude and longitude for the geographic point;
   converting the latitude and longitude to coordinates in a specific coordinate system uniquely identifying the point;
   determining one or more minimum enclosing areas in the coordinate system for the point;
   determining the specific classification of the geographic point within the minimum enclosing area;
   returning to the requesting entity the specific classification of the geographic point.

63. The method of claim 62 wherein the step of determining one or more minimum enclosing areas for the point further comprises the step of determining one or more minimum enclosing rectangles for the point.

64. The method of claim 63 wherein the step of determining one or more minimum enclosing rectangles for the point further comprises the steps of:
   accessing a classification database having a spatial index;
   finding in the spatial index a first rectangle that encloses the point;

finding in the spatial index each subordinate rectangle within the first rectangle;

repeating the previous two steps using each subordinate rectangle as a first rectangle until no more subordinate rectangles that enclose the point are found;

returning as minimum enclosing rectangles the set of all subordinate rectangles found in the final step to enclose the point;

for each subordinate rectangle found that encloses the point, returning from the classification database the classification that corresponds to the subordinate rectangle found;

for each classification, returning the set of polygon coordinates defining that classification.

65. The method of claim 62 wherein the step of determining the specific classification of the geographic point within the minimum enclosing area further comprises the steps of:

for each subordinate rectangle found that encloses the point, retrieving from the classification database the classification that corresponds to the subordinate rectangle found;

for each classification, retrieving the set of polygon coordinates defining that classification;

for each set of polygon coordinates, determining whether the point is inside or outside the polygon;

returning the set of all classifications for which the point is inside the corresponding polygon.

66. The method of claim 62 wherein an acceptable time of setup of a wireless telephone call must be less than one second.

67. The method of claim 62 further comprising the steps of:

updating components of a form of the classification database and spatial index which is not accessible by a client retrieval process;

converting the updated components into a form capable of access by a client retrieval process;

compressing the converted updated components into a form capable of storage in memory of the system used for client retrieval;

storing the compressed converted updated components in the memory of the system used for client retrieval, without preventing client retrieval access to components not updated;

switching client retrievals to access the compressed converted updated components of the classification database.

68. A method of determining, within an acceptable caller waiting time during a wireless telephone call, a location identifier of a geographic point using said point's geographic latitude and longitude, comprising the steps of:

accepting from a requesting entity a latitude and longitude for the geographic point;

converting the latitude and longitude to coordinates in a specific coordinate system uniquely identifying the point;

determining a minimum enclosing area in the coordinate system for the point;

determining the location identifier of the minimum enclosing area;

associating the location identifier with the geographic point;

returning to the requesting entity the location identifier of the geographic point.

69. The method of claim 68 wherein the step of determining a minimum enclosing area further comprises the step of determining a minimum enclosing rectangle.

70. The method of claim 69 wherein the step of determining one or more minimum enclosing rectangles for the point further comprises the steps of:

accessing a classification database having a spatial index;

finding in the spatial index a first rectangle that encloses the point;

finding in the spatial index each subordinate rectangle within the first rectangle;

repeating the previous two steps using each subordinate rectangle as a first rectangle until no more subordinate rectangles that enclose the point are found;

returning as minimum enclosing rectangles the set of all subordinate rectangles found in the final step to enclose the point;

for each subordinate rectangle found that encloses the point, returning from the classification database the classification that corresponds to the subordinate rectangle found;

for each classification, returning the set of polygon coordinates defining that classification.

71. The method of claim 68 wherein the step of determining the specific location identifier of the geographic point within the minimum enclosing area further comprises the steps of:

for each set of polygon coordinates, determining whether the point is inside or outside the polygon;

returning the set of all classifications for which the point is inside the corresponding polygon.

72. The method of claim 68 wherein an acceptable caller waiting time during a wireless telephone call must be less than five seconds.

73. The method of claim 68 further comprising the steps of:

updating components of a form of the classification database and spatial index which is not accessible by a client retrieval process;

converting the updated components into a form capable of access by a client retrieval process;

compressing the converted updated components into a form capable of storage in memory of the system used for client retrieval;

storing the compressed converted updated components in the memory of the system used for client retrieval, without preventing client retrieval access to components not updated;

switching client retrievals to access the compressed converted updated components of the classification database.

74. A method of increasing the size of a combined geographic classification database and spatial index storable in the memory of a computer system, without altering substantially the physical structure, logical structure, software content or software operation within the system, comprising the steps of:

creating a combined geographic classification database and spatial index stored in a database in the mass storage of a computer system;

converting the combined geographic classification database and spatial index into a form capable of access by a client retrieval process;

compressing the converted geographic classification database and spatial index into a form capable of storage in the memory of a computer system;

storing the compressed geographic classification database and spatial index in the memory of a computer system.

75. A method of increasing the size of a combined geographic classification database and spatial index storable in the memory of a computer system, without altering substantially the physical structure, logical structure, software content or software operation within the system, comprising the steps of:

creating a combined geographic classification database and spatial index stored in a database in the mass storage of a computer system;

dividing the combined geographic classification database and spatial index into components independently retrievable;

converting each divided geographic classification database and spatial index into a form capable of access by a client retrieval process;

compressing each converted geographic classification database and spatial index into a form capable of storage in the memory of a computer system;

storing each compressed geographic classification database and spatial index in the memory of a computer system.

76. A location management platform apparatus for determining, within an acceptable time of setup of a wireless telephone call, a classification of a geographic point using said point's geographic latitude and longitude, comprising:

means for accepting from a requesting entity a latitude and longitude for the geographic point;

means for converting the latitude and longitude to coordinates in a specific coordinate system uniquely identifying the point;

means for determining one or more minimum enclosing areas in the coordinate system for the point;

means for determining the specific classification of the geographic point within the minimum enclosing area;

means for returning to the requesting entity the specific classification of the geographic point.

77. The location management platform apparatus of claim 76 wherein the means for determining one or more minimum enclosing areas for the point further comprises means for determining one or more minimum enclosing rectangles for the point.

78. The location management platform apparatus of claim 77 wherein the means for determining one or more minimum enclosing rectangles for the point further comprises:

means for accessing a classification database having a spatial index;

means for finding in the spatial index a first rectangle that encloses the point;

means for finding in the spatial index each subordinate rectangle within the first rectangle;

means for repeating the previous two steps using each subordinate rectangle as a first rectangle until no more subordinate rectangles that enclose the point are found;

means for returning as minimum enclosing rectangles the set of all subordinate rectangles found in the final step to enclose the point;

for each subordinate rectangle found that encloses the point, means for returning from the classification database the classification that corresponds to the subordinate rectangle found;

for each classification, means for returning the set of polygon coordinates defining that classification.

79. The location management platform apparatus of claim 76 wherein the means for determining the specific classification of the geographic point within the minimum enclosing area further comprises:

for each subordinate rectangle found that encloses the point, means for retrieving from the classification database the classification that corresponds to the subordinate rectangle found;

for each classification, means for retrieving the set of polygon coordinates defining that classification;

for each set of polygon coordinates, means for determining whether the point is inside or outside the polygon;

means for returning the set of all classifications for which the point is inside the corresponding polygon.

80. A location management platform apparatus for determining, within an acceptable caller waiting time during a wireless telephone call, a location identifier of a geographic point using said point's geographic latitude and longitude, comprising:

means for accepting from a requesting entity a latitude and longitude for the geographic point;

means for converting the latitude and longitude to coordinates in a specific coordinate system uniquely identifying the point;

means for determining a minimum enclosing area in the coordinate system for the point;

means for determining the location identifier of the minimum enclosing area;

means for associating the location identifier with the geographic point;

means for returning to the requesting entity the location identifier of the geographic point.

81. The location management platform apparatus of claim 80 wherein the means for determining a minimum enclosing area further comprises means for determining a minimum enclosing rectangle.

82. The location management platform apparatus of claim 81 wherein the means for determining one or more minimum enclosing rectangles for the point further comprises:

means for accessing a classification database having a spatial index;

means for finding in the spatial index a first rectangle that encloses the point;

means for finding in the spatial index each subordinate rectangle within the first rectangle;

means for repeating the previous two steps using each subordinate rectangle as a first rectangle until no more subordinate rectangles that enclose the point are found;

means for returning as minimum enclosing rectangles the set of all subordinate rectangles found in the final step to enclose the point;

for each subordinate rectangle found that encloses the point, means for returning from the classification database the classification that corresponds to the subordinate rectangle found;

for each classification, means for returning the set of polygon coordinates defining that classification.

83. The location management platform apparatus of claim 80 wherein the means for determining the specific location identifier of the geographic point within the minimum enclosing area further comprises:

for each set of polygon coordinates, means for determining whether the point is inside or outside the polygon;

means for returning the set of all classifications for which the point is inside the corresponding polygon.

84. A software program stored on machine-readable media for operating a location management platform to perform the following operations:

accept the coordinates of a geographic point from an input source;

access a classification database having a spatial index;

find in the spatial index a first rectangle that encloses the point;

find in the spatial index each subordinate rectangle within the first rectangle;

repeat the previous two steps using each subordinate rectangle as a first rectangle until no more subordinate rectangles that enclose the point are found;

return as minimum enclosing rectangles the set of all subordinate rectangles found in the final step to enclose the point;

for each subordinate rectangle found that encloses the point, determine from the classification database the classification that corresponds to the subordinate rectangle found;

for each classification, determine the set of polygon coordinates defining that classification associate the point with each classification and said classification's set of polygon coordinates.

* * * * *